(No Model.) 2 Sheets—Sheet 1.
C. H. STRATTON.
JUMP SEAT FOR VEHICLES.
No. 358,794. Patented Mar. 1, 1887.
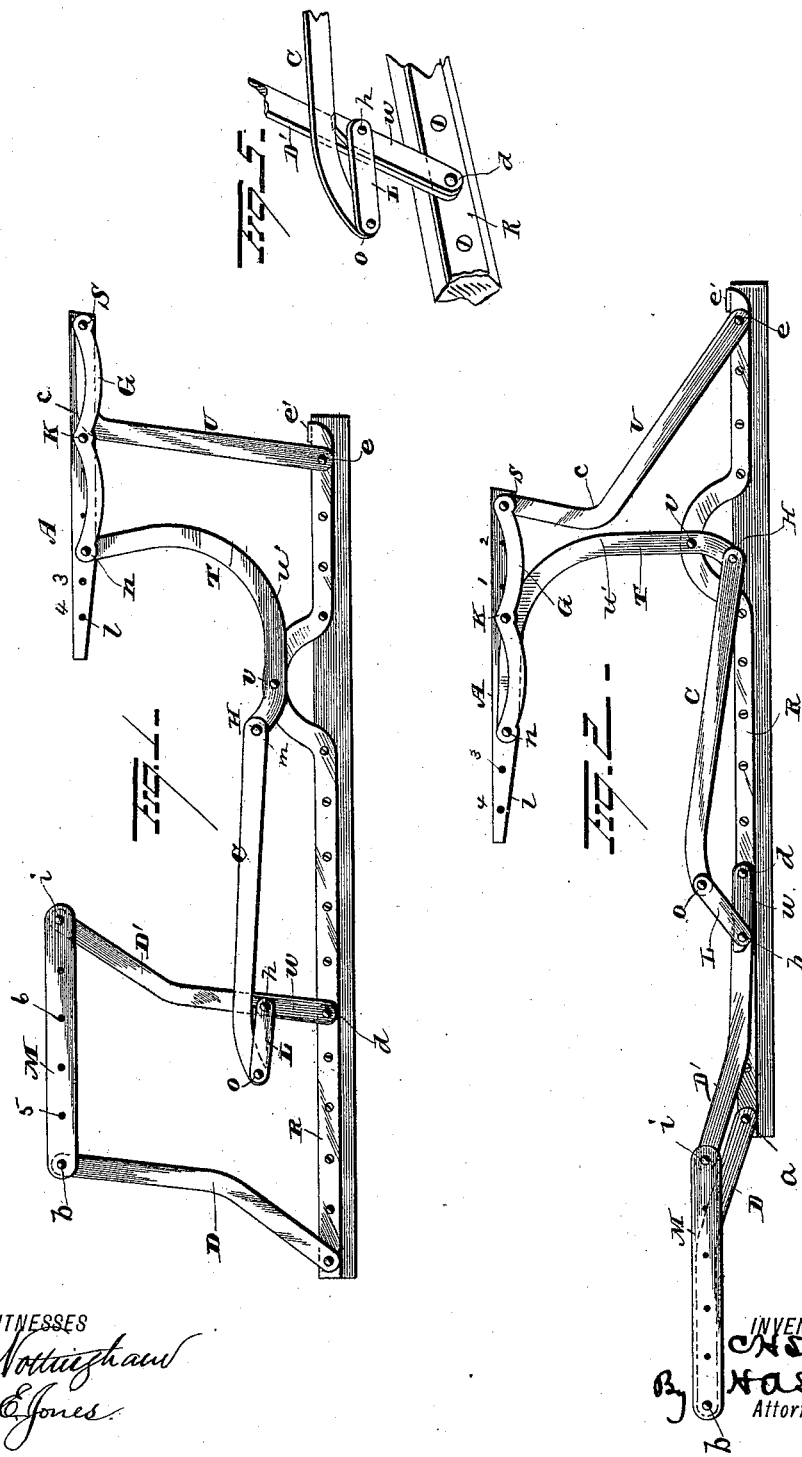
WITNESSES
INVENTOR
Attorney

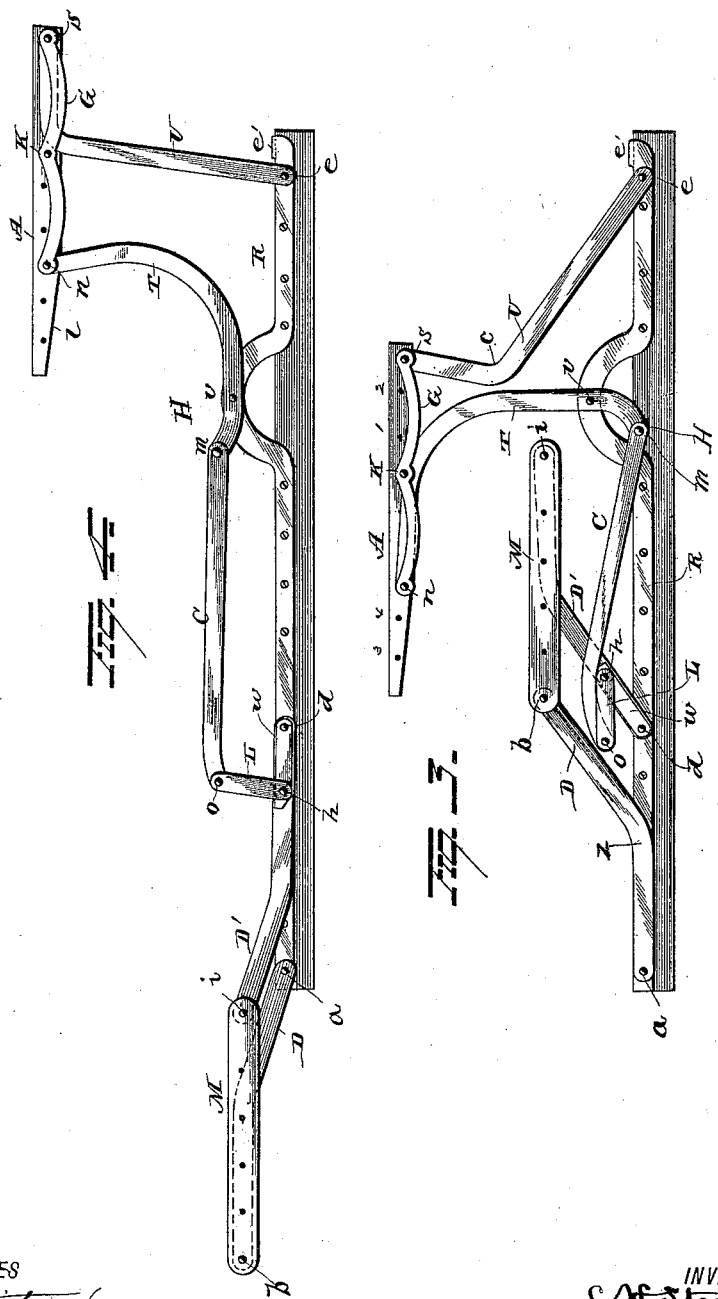

UNITED STATES PATENT OFFICE.

CHARLES H. STRATTON, OF SALEM, OHIO.

JUMP-SEAT FOR VEHICLES.

SPECIFICATION forming part of Letters Patent No. 358,794, dated March 1, 1887.

Application filed December 6, 1886. Serial No. 220,817. (No model.)

*To all whom it may concern:*

Be it known that I, CHARLES H. STRATTON, of Salem, in the county of Columbiana and State of Ohio, have invented certain new and useful Improvements in Jump-Seats for Vehicles; and I do hereby declare the following to be a full, clear, and exact description of the invention, such as will enable others skilled in the art to which it appertains to make and use the same.

My invention relates to shifting seats for vehicles, and particularly to the type known as "jump-seats," in which two seats are so connected by levers and links at their sides that their relative positions may be altered to permit either one or both to be used, as may be desired.

The object of my present invention is to so construct and arrange two seats in a vehicle that the rear seat may be automatically secured as a rear seat when two seats are used, or advanced to the center of the vehicle and have the front seat fold under it, or in an opposite direction, the rear seat being locked in either position until changed by a lifting motion.

A further object is to construct and arrange relatively the front and rear seats of a two-seated vehicle, to permit the front seat to be used in connection with a rear seat, or be "jumped" to either a forward lie-down position or a rear location, the latter movement carrying this front seat from its normal place to a recumbent position beneath the advanced rear seat, and locking both seats securely when they are both in use, or given the changed relative locations, as above stated.

A further object is to provide a jump-seat vehicle that has seat-shifting mechanism made up of simple parts that may be made accurately without special machinery and with such economy of material as to permit manufacture at a low initial cost.

With these ends in view, my invention consists in certain features of construction and combinations of parts, as will be hereinafter described, and pointed out in the claims.

In the drawings making a part of this specification, Figure 1 is an elevation of the body of a vehicle, with a side removed to show the seat-irons, both seats being in normal position for use. Fig. 2 is a side elevation of the shifting device, with the front seat depressed forward of its normal position and the rear seat advanced to use singly. Fig. 3 exhibits the rear seat of a vehicle forwardly advanced and locked for use, with the front seat in a prostrate position beneath it. Fig. 4 is a side elevation of the seat-shifting mechanism, with the rear seat in normal position and locked for use, the forward seat being lowered toward the front of the vehicle. Fig. 5 is a detail view of the lower end of a front-seat leg.

The body of the vehicle is made of a proper length to suit the positions given to the seats. In other respects its design may be varied to suit the tastes of different builders.

The side plates or rockers, R, are located upon each side of the vehicle and secured to the side sills by screws or other proper means. These plates R are curved upwardly at the point V to form an elevation edgewise on their bodies.

The rear seat has two plates, A, one on each side, of a suitable thickness and width, perforated through their sides with screw or bolt holes 1 2, &c., the plates being countersunk upon their inner or outer faces. To the rear ends of the plates A are pivoted the bent legs U, the bends $c$ being made edgewise of the material and approaching a right angle. The lower ends of the seat-legs U are pivoted to the rear end of their corresponding rocker-plates R at or near the point $e$.

At a point, $n$, toward the front of the seat-plates A, the curved front legs, T, are pivoted. The plates G are held in position opposite the inner face of the plates A, and in connection with these plates, by shouldered rivets, bolts, or screws at the points $n\ s$ K, the rivets $n\ s$, that pass through the ends of the legs T U, permitting them to have pivotal movement on these fulcrums, and at the same time hold the two opposed plates, A G, in rigid adjustment in relation to each other. The plates G are curved downwardly from a central point, K, on each side of this point to expose the screw or bolt holes in the plates A, and thus permit the introduction of screws or bolts through them into seat supports or blocks that are attached upon the sides of these plates. A sufficient space is allowed to intervene between the opposed faces of the plates A and G to permit the insertion of the ends of the legs T and U. The front legs, T, are each secured pivotally to the crown of the curved portions V of the rocker-plates R, as shown at $v$ in the figures.

The plates G may be made bent at a right angle inwardly at either one or both points $n$ $s$ on the front and rear ends of these side plates, so as to produce ears or lugs that, being perforated for screws or bolts, can be attached to the back seat, and thus afford a brace or support to this seat.

To the lower outwardly-curved extremities, H, of the front legs, T, of the rear seat the bars C are pivoted by their rear ends, $m$. The forward ends of these parallel bars C are pivoted to the front ends of the short links L, the front portions of the bars C being slightly curved edgewise, with the convex edge above. The links L have their rear ends pivotally secured to the inner sides of the rear legs, D′, of the front seat, and an inspection of Fig. 5 will show that thickening plates $w$, secured to the inner face of the lower end of these legs D′, are extended upwardly a suitable distance to form upon their inclined top ends a firm shoulder or support for the lower edges of the bars C, and by this means provide sufficient space for the free folding action of the bars C, links L, and rear legs, D′, in relation to each other.

When both seats are in the position shown in Fig. 1, the front seat can be readily folded forward, as the connecting pivotal point $o$ of link L and bar C is in a plane above the centers of the extremities H, so that the locking action that serves to hold the front seat from a rearward movement when both seats are in position for use, as shown in Fig. 1, will not interfere with the forward movement of the front seat to cause it to assume the position shown in Fig. 2. The lowered position of the front seat, as shown in this figure, may be utilized to afford a low seat for children's accommodation, or to get the seat out of the way to reach the back seat easily.

The rear legs, D′, of the front seat are pivoted at their upper ends at the point $i$ to the side plates, M, of the front seat. The side plates, M, are flat plates of proper width and thickness, and are perforated through their sides with a sufficient number of screw or bolt holes, 5 6, &c., for the attachment of the seat-blocks that are affixed to the inner faces of the plates M, the screw or bolt holes 5 6, &c., in them being countersunk on the outer faces of these plates to permit wood screws or bolts to be inserted into the seat-blocks. The rear legs, D′, are curved edgewise at a point, $w$, near their upper ends.

The front legs, D, of the front seat are curved at $z$, their concave edges being above. The front ends of these legs D are pivoted to the rocker-plates R at $a$, the top ends of these legs being pivotally secured to the front ends of the side plates, M, as shown at $b$. (See Figs. 2 and 3.)

The front seat is provided with folding side arms and lazy-back, if desired. The position of the seat with regard to the legs may be shifted to the front or rear by the attachment of the plates M upon the seat or its supporting-blocks at any proper point.

The relative height of the legs D D′ T U of the front and rear seats can be adjusted higher or lower by the elevated or depressed position given to the blocks upon which they are secured, and to which the plates A are attached, and as the legs T of the rear seat are pivoted higher on the rocker-plates R than the rear legs, U, when this seat is moved forward the pivotal point $n$ on the plates A is thrown higher than the point $s$ at the rear of these plates, and in this way clearance-room is provided for the rearward movement of the front seat when it is given the relative position shown in Fig. 3.

The rear ends of the rocker-plates R have each a lip or outwardly-extending flange, $e'$, formed integral with their bodies. These laterally-extended flanges are designed to rest upon the top surface of the side sills of the vehicle, and are there rigidly secured to prevent a twisting action of the rocker-plates. When the rear seat is in the rear position just named, the front convex edges of the legs U will impinge upon the bolts or rivets K, and the locking action of this contact of parts will hold the rear seat secure in the normal position shown in Figs. 1 and 4.

In Fig. 1 the rear seat and front seat are in locked upright position for use in a two-seated vehicle. The locking of these seats for use as named is effected by the joint action of the bars C and links L, in combination with the legs T and U of the rear seat and the rear supports, D′, of the front seat. The links L, being pivoted at $o$ to the connecting-bars C, are so relatively located as to cause this point of attachment $o$ to lie slightly above the pivoted points $h$ H when the seats are both elevated for use; and, further, when the front seat is folded under the advanced rear seat, as shown in Fig. 3, the pivotal point $o$ will lie below the point of abutment of the lower edges of the rods C with the inclined top shoulders of the re-enforce plates $w$, that are attached to rear legs, D. This latter position of the link ends $o$ will cause the abutment ends of the plates $w$ to act as fulcrum-points to lift the rear end of the parallel bars C and cause the rear movement of the rear seat, so as to permit the front seat to be elevated by a forward pull upon this seat, and when the seats are in position, as shown in Fig. 3, the rear seat being securely locked until the forward seat is elevated somewhat from a lie-down position. The rear limbs, U, are held upright by the contact of their forward curved edges with the shoulder bolts or rivets K, the forward ends of limbs T extending nearly in a horizontal line toward their point of pivotal connection $v$ with the rocker-plates R. The short ends of the front legs, T, that extend from $v$ to H are curved slightly to cause the extremities H, where the bars C connect, to lie above a line drawn through $h$ $v$, and thus cause a lock of the rear seat when the front seat and rear seat are in upright position, as shown in Fig. 1, and the front seat is occupied, the bars C now lying in nearly a horizontal plane, and resting upon the plates w with their lower edges, as above stated. The downwardly-curved ends of bars C and the pivoted links L are in such relative adjustment that the pivotal points o h H v are nearly in a right line horizontally, and, in conjuntion with the rear limbs of the rear seat, form a rigid lock to hold the front and rear seat upright in proper position for use; and it is evident that the weight of occupants of these seats will have a tendency to lock the adjusted parts to prevent displacement, as a change of relative position of these seats can only be effected by a forward rocking movement of the rear seat sufficient to carry the pivoted end H out of locking-line of pivots o h m v, drawing down on connecting-rod C and link L. When the forward movement of the rear seat is designedly effected to alter the relative locations of the seats, the rear seat may be placed in a central position in the body of the vehicle, as shown in Figs. 2 and 3.

In Fig. 2 the front seat is shown projected forwardly to furnish a child's seat or to provide foot-room for occupants. When so adjusted, the locking of the rear seat is effected by the abutment of the convex or rear edges of the curved front limbs, T, of this seat against the shoulder bolts or rivets K, the pivoted joints h o d assuming the positions shown in Fig. 2. When occupied, the rear seat, as adjusted in Figs. 2 and 3, will be stable and without side sway, as the upper curved portions of the front legs, T, are embraced by the parallel faces of the plates A G when the seat is in forward adjustment.

In Fig. 3 the rear seat is shown advanced, as in Fig. 2, and locked by the abutment of its front limbs coming into bearing-contact with the shoulder-bolts K. The front seat is here shown depressed to the rear of its upright position by rocking it backward upon its pivot-connections a d; and, as before stated, the relative height of the seats, as well as their pivotal distance apart, is such as to permit the front seat to clear the front edge of the advanced rear seat, and lie with its cushioned top protected beneath the rear seat, the points H o h d acting, together with the front and rear legs of the rear seat, to hold it secure from accidental displacement toward the front or rear of the vehicle.

In Fig. 4 the rear seat is adjusted and locked to the rear, or in normal position, the front seat being made to recline toward the dasher or front of the vehicle. The joints of the rear seat will lock it in manner similar to that shown in Fig. 1, and described in connection with that figure of the drawings.

The several pieces of this device may be made from bar iron or steel, and can be cut off and formed with but little manual labor. The strain upon the several parts being thrown upon the material edgewise, a comparatively light weight of metal can be used to secure necessary rigidity. Economy in the initial cost of manufacture is thus effected, and a compact, convenient, automatically-adjustable, and perfectly-reliable shifting mechanism for single or double seated vehicles is produced.

To operate these seats and cause them to assume the desired position with regard to each other: When the front and rear seats are folded to use the rear seat singly, as shown in Fig. 3, and it is desired to use both the front and rear seats, the operator simply grasps the front seat to pull it forward, and at the same time pushes the rear seat back. A sufficient movement on their pivotal joints will cause these seats to assume the positions shown in Fig. 1. If it is desired to close the seats that are in position shown in Fig. 1 and give them the position shown in Fig. 3, first fold the side arms and lazy-back on front seat; then move rear seat forward and front seat rearward simultaneously, the motion being continued until the seats are in their proper respective positions. If the front seat is to be lowered toward the front of the vehicle when both seats are in position for use, a forward movement of the front seat will cause it to assume the desired position. Again, if the rear seat is to be advanced from a rear position when the front seat is lowered forwardly, it may be so moved without disturbing the front seat from its lowered position.

Slight changes may be made in the construction of this device without exceeding its legitimate scope. I do not, therefore, restrict myself to the exact forms shown, but desire such latitude in matters of minor detail as will fairly come within the spirit and manifest scope of my invention.

Having fully described my invention, what I claim as new, and desire to secure by Letters Patent, is—

1. In a shifting-seat vehicle, the combination, with rocker-plate, the vehicle-seats and seat-supporting legs, the rear supporting-legs of the front seat being provided with re-enforcing plates, of the bar-and-link connection pivotally connecting the re-enforced lower portion of the rear legs on the front seat with the lower projected extremities of the front legs on the rear seat, substantially as set forth.

2. In a shifting-seat vehicle, the combination, with the rocker-plates provided near the rear end with an upward curvature, the front and rear seat and supporting-legs pivotally connecting the seats to the rocker-plates, the front legs of the rear seat having forward and upwardly-turned extremities, of the bar-and-link connection loosely connecting the front seat to the forward and upward extremities of the legs T, whereby the position of the front seat may be varied without altering the position of the back seat, substantially as set forth.

3. In a shifting-seat vehicle, the combination, with the rocker-plates, the front and rear seat, and the inwardly-bent supporting-legs pivotally connecting the seats to the rocker-plates, the forward supporting-legs of the front seat being provided at their lower end with upwardly and forwardly turned extremities, and the lower ends of the rear supporting-legs of the front seat with a re-enforced plate, of the connecting-bars, one end of which is pivoted to the upwardly and forwardly turned extremity on the front legs of the rear seat and the opposite end bent downwardly, and the link pivotally connecting the bent end of the connecting-bars to the re-enforced portion of the rear legs of the front seat, substantially as set forth.

4. The combination, with the rocker-plates, the seat-plates, and the supporting-legs, bent, substantially as described, to form bracing and supporting shoulders for preventing the accidental collapse of the seats, the lower ends of the front supporting-legs of the rear seat being provided with upwardly and forwardly turned extremities, and the rear legs of the front seat with a re-enforcing plate, said plate terminating in an abutting shoulder, of the bars connecting the upwardly and forwardly turned extremities of the front supporting-legs of the rear seat with this re-enforcing plate by means of connecting-links, substantially as set forth.

In testimony whereof I have signed this specification in the presence of two subscribing witnesses.

CHARLES H. STRATTON.

Witnesses:
J. H. THOMAS,
W. W. HOLE.